Nov. 17, 1970  R. DOUSSET  3,541,598
MOBILE AND TRANSPORTABLE APPARATUS FOR LOADING AND UNLOADING
CONTAINERS ONTO TRANSPORTERS
Filed April 2, 1969  7 Sheets-Sheet 1
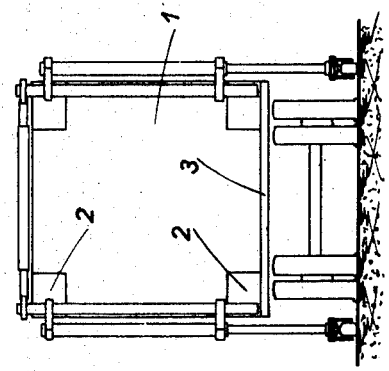
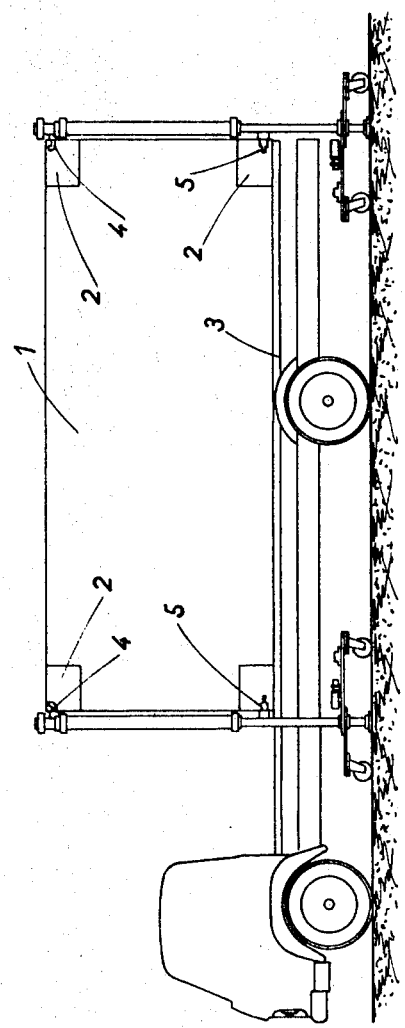
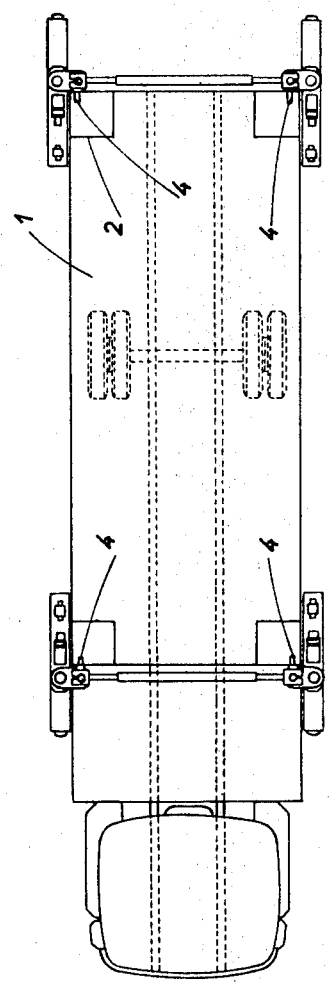

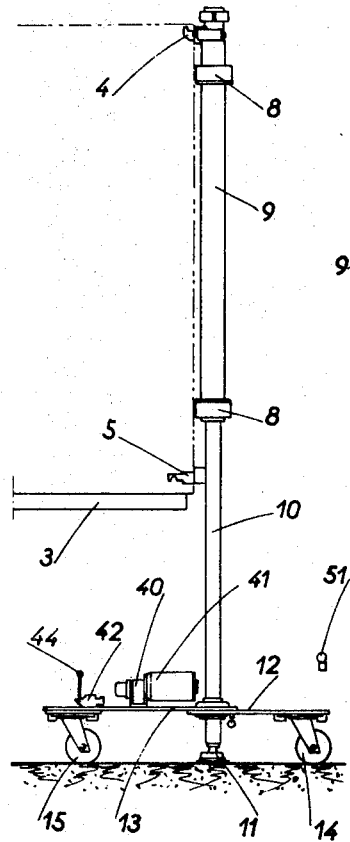

Nov. 17, 1970   R. DOUSSET   3,541,598
MOBILE AND TRANSPORTABLE APPARATUS FOR LOADING AND UNLOADING
CONTAINERS ONTO TRANSPORTERS
Filed April 2, 1969   7 Sheets-Sheet 5

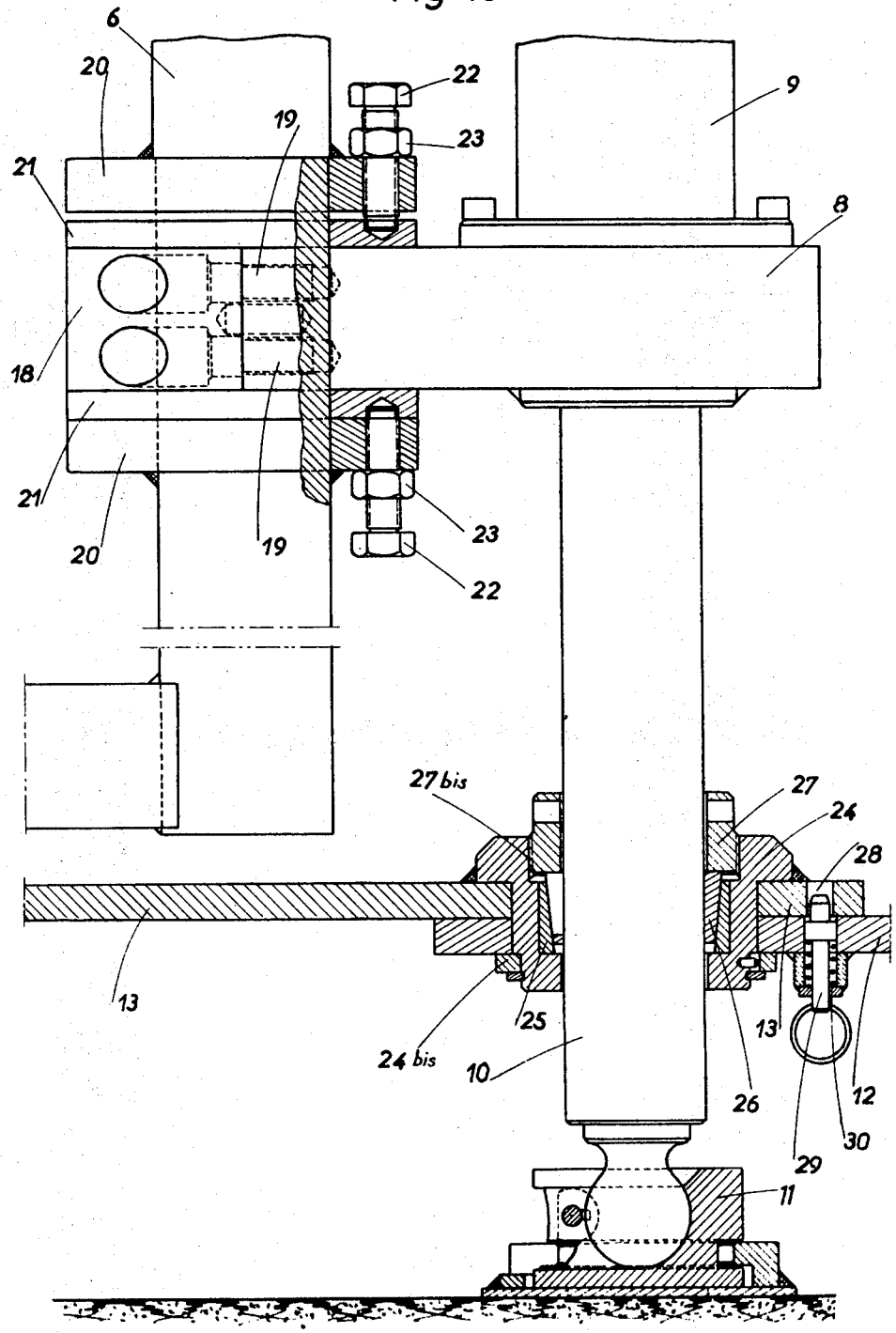

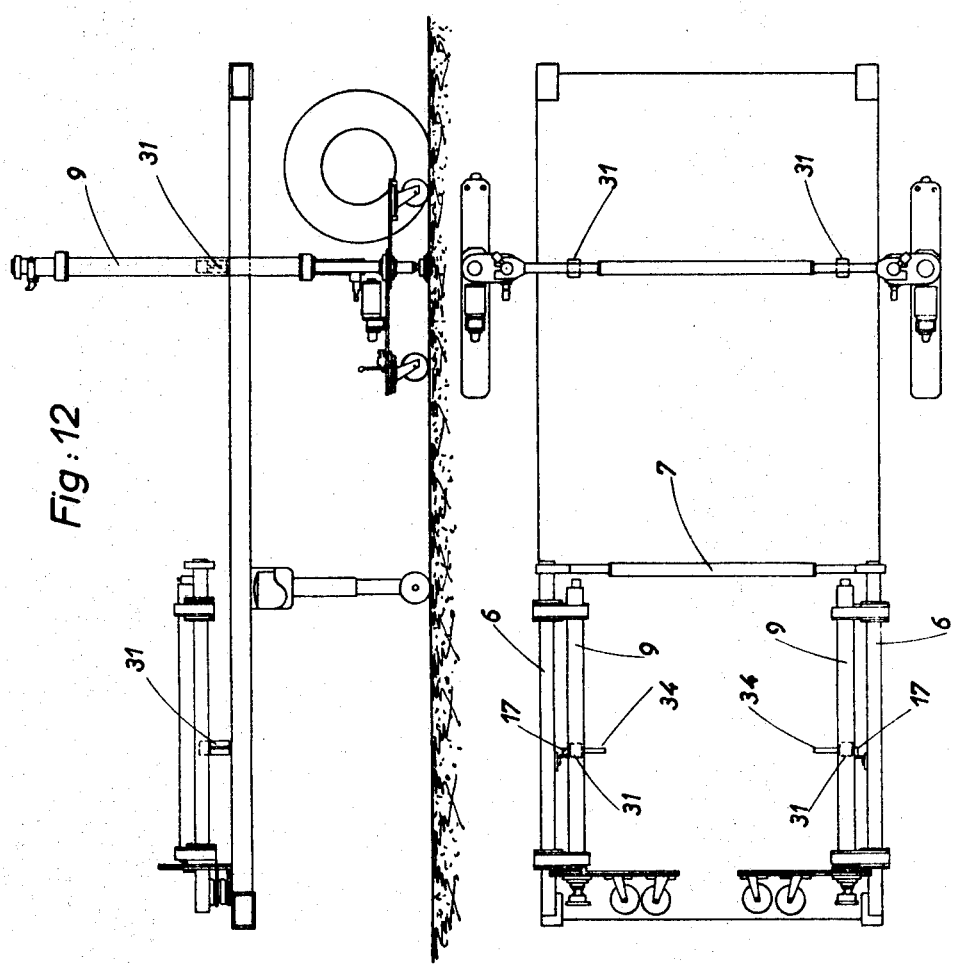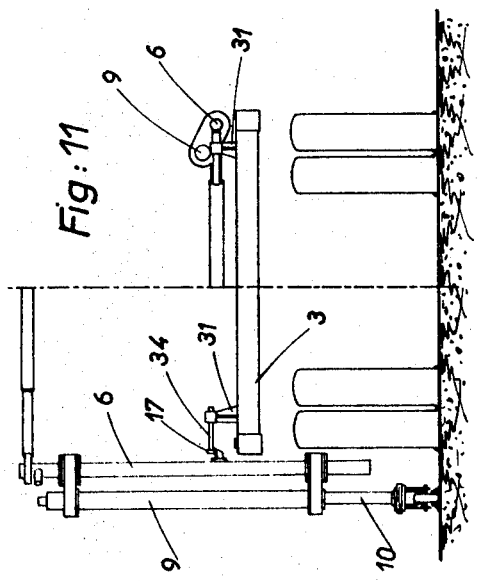

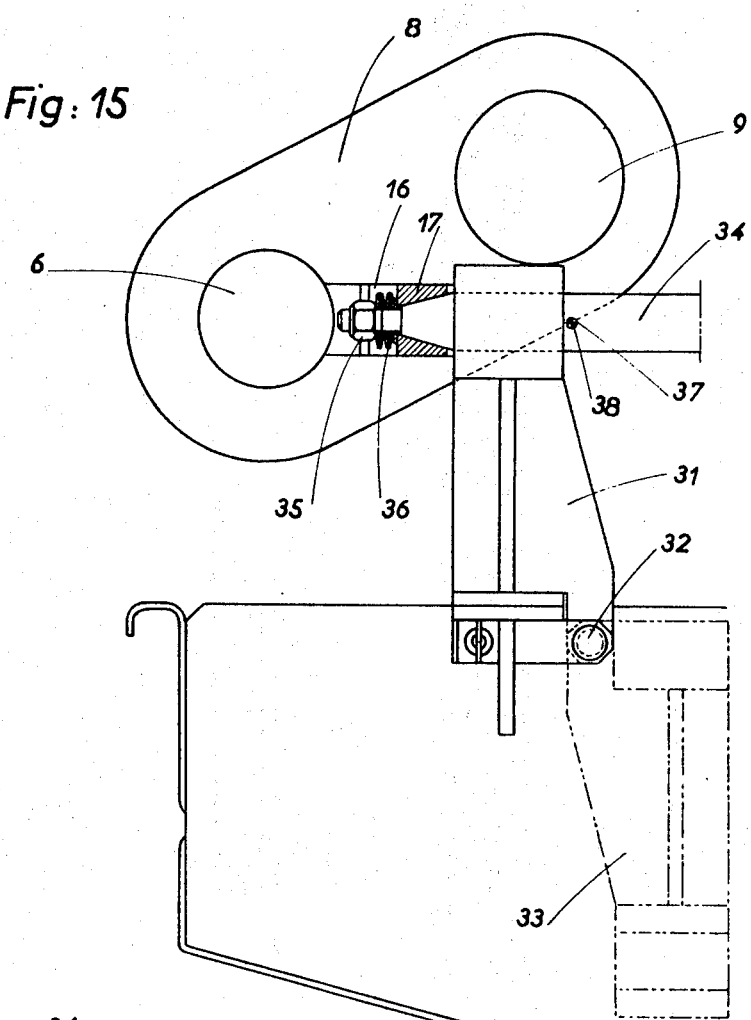
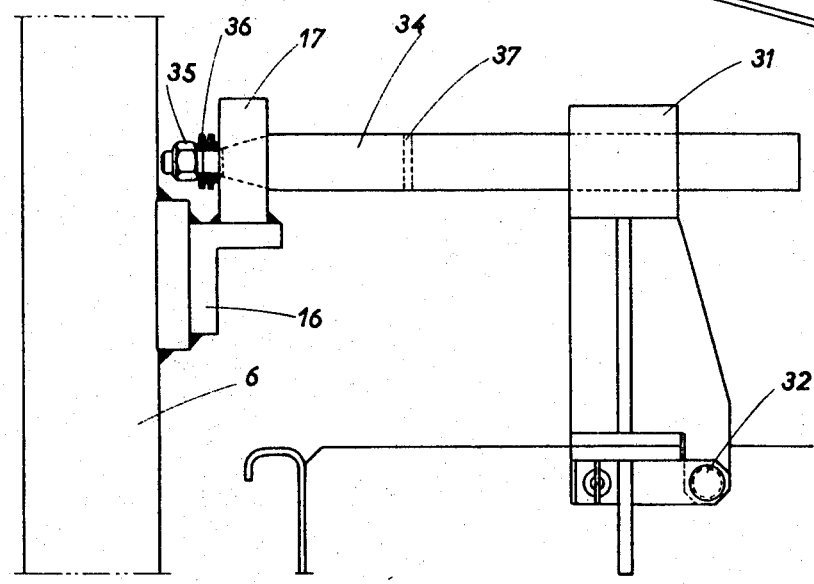

Fig:16
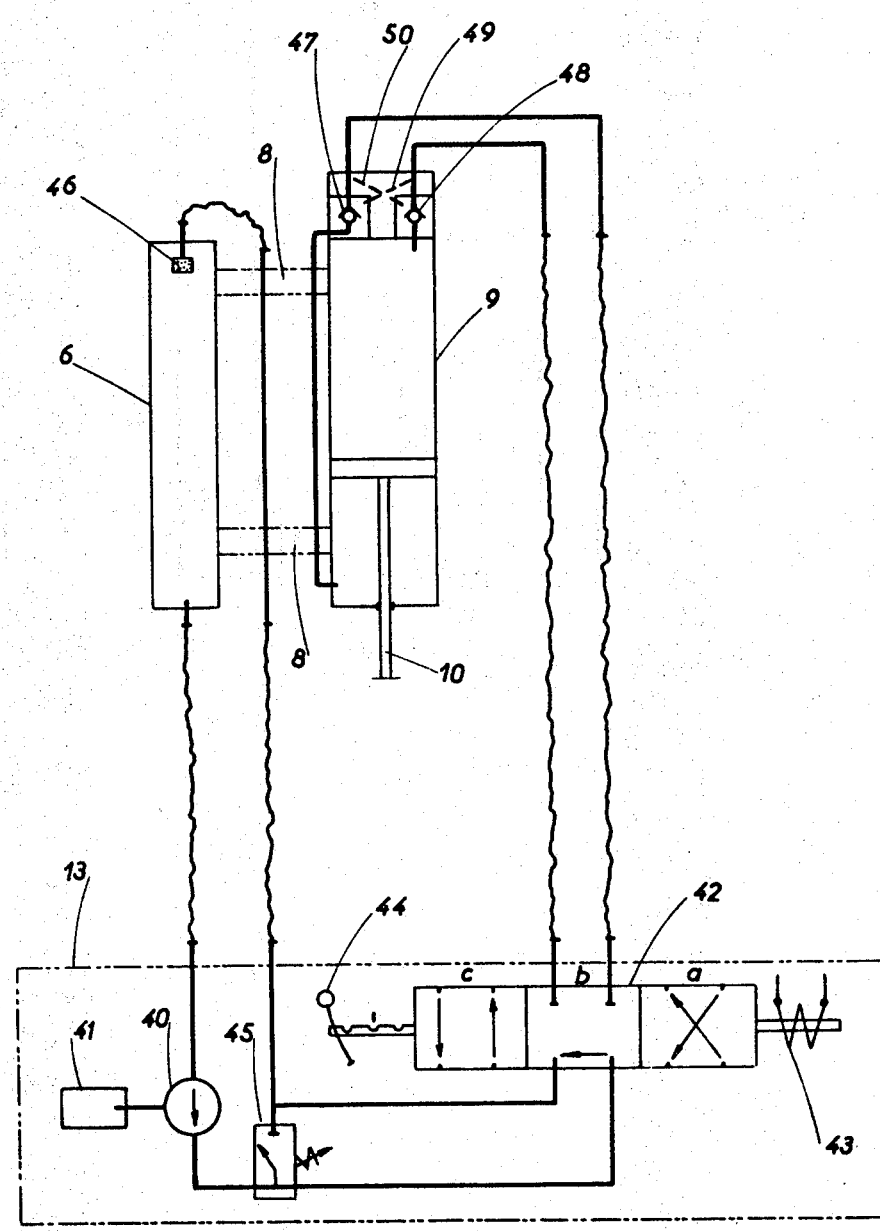

United States Patent Office 3,541,598
Patented Nov. 17, 1970

3,541,598
MOBILE AND TRANSPORTABLE APPARATUS FOR LOADING AND UNLOADING CONTAINERS ONTO TRANSPORTERS
Remy Dousset, Lyon, France, assignor to Societe Nouvelle des Ateliers de Venissieux, Venissieux, Rhone, France
Filed Apr. 2, 1969, Ser. No. 812,783
Claims priority, application France, Apr. 10, 1968, 147,675
Int. Cl. B60p 1/64
U.S. Cl. 214—392   7 Claims

ABSTRACT OF THE DISCLOSURE

A mobile and transportable apparatus for loading and unloading containers onto transporters, the apparatus including two mobile portals the uprights of each of which are coupled by a telescopic element, each of which is engageable with a container part and each of which carries parallel with it and movable about its axis a jack extensible to engage the gear in which the upright is movable over the ground.

---

This invention relates to a container-handling apparatus of use more particularly for loading and unloading containers onto and from transportation platforms, and, as a secondary feature, to the transportation of empty containers over limited distances.

Most of the conventional container-handling apparatuses are conventional lifting apparatuses just fitted with lifting beams or special facilities for gripping the special loads which containers are. In other words, such apparatuses are stationary or transportable lifting apparatuses which must be of considerable size and bulk to cope with possible container dimensions.

The main advantage of carriage by containers—i.e., the fact that containers can be carried by a number of consecutive transportation facilities without the products carried by the container requiring intermediate handling—becomes fully operative only if the container can be taken in charge at the place where it is loaded, then taken to the place where the container contents will finally be used. As a rule, these initial and final loading places are devoid of stationary lifting facilities, and the need to bring mobile lifting tackle to such places leads to much of the savings provided by container carriage being lost.

Transportation platforms fitted with a crane have been devised, but a permanent crane takes up a considerable amount of platform space which is entirely lost for the carriage of goods other than containers and in cases in which the containers are going to users having conventional lifting tackle.

According to the present invention there is provided mobile transportable container-handling apparatus characterised in that the apparatus comprises two independent portals, each portal comprising two uprights interconnected by a telescopic cross-member, each upright having means for securing it to a container and having pivoted therein in an attitude parallel thereto a jack having at the bottom a ground engaging member and carrying a running-gear facility articulated thereto, means being provided to lock the facility relative to the jack.

In order that the invention may be well understood there will now be described an embodiment thereof, given by way of example only, reference being had to the accompanying drawings wherein:

FIGS. 1 to 3 together give an overall diagrammatic view of a two-portal apparatus in the position for loading and unloading a container on to or from a truck platform;

FIGS. 4 to 6 are detailed views of a portal secured to a container and shown in the loading or unloading position, the container not being shown so as to facilitate an uderstanding of the drawings, FIGS. 4 and 5 being views in elevation—in side elevation and from the front of the truck respectively—of the rear portal, while FIG. 6 is a plan view;

FIG. 10 is a view, partly in elevation and partly sectioned, showing the details of how the pack is articulated to the upright and how the running-gear facility is articulated to the jack rod;

Figure 7:
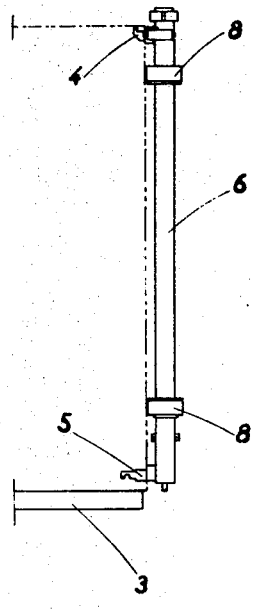
FIGS. 7 to 9 are views corresponding to FIGS. 4 to 6 except that the portal has been folded back onto the container surface, in the position for carriage on the platform.

FIGS. 11 to 13 show how the two portals are arranged on the platform in the transportation position when the platform is empty, FIG. 11 being a view in rear elevation, the half-view on the left showing the portal simply engaged on its carriage supports, while the half-view on the right shows the portal fully folded and in the position for carriage, FIGS. 12 and 13 being a view in side elevation and a plan view, respectively, in which the rear portal is just engaged on the support whereas the front portal is in the folded-for-carriage position;

FIG. 14 is a detailed view showing the articulation of the portal to a carriage support in the same position as in the left-hand half-view of FIG. 11;

FIG. 15 is a similar detailed view but for the position corresponding to the righthand half-view of FIG. 11, and FIG. 16 shows the hydraulic control circuit for one portal jack and the relative arrangement of the flexible and rigid piping (not shown in FIGS. 1 to 15 so as to facilitate an understanding thereof).

Referring to FIGS. 1 to 3, a container 1 has a standard hollow corner member 2 at each corner and rests on platform 3 of a lorry or truck. Container 1 receives on each front and rear surface one of the two portals of the apparatus; a top securing spindle 4 and a bottom securing spindle 5 of the apparatus engage and are locked in the top and bottom corner members, respectively, of the container.

FIGS. 4 to 9 are views in greater detail of a portal whose securing spindles or pins 4, 5 are rigidly secured to tubular uprights 6 interconnected at the top by a telescopic cross-member 7 whose length can be adjusted to suit container size. Articulated to each upright 6 are two rods 8 bearing a casing 9 of a double-acting reciprocating hydraulic pack whose rod 10 is directed towards the ground. A shoe or sole or the like 11 for bearing on the ground is connected via a swivel joint to the end of each jack rod 10. Also articulated thereto, are two asymmetrical running-gear elements, in the form of a short element and a long element formed by shoes or soles or the like 12, 13 respectively having castoring rollers 14, 15 at their ends.

Rigidly secured to each tubular upright 6 is a right-angled bracket 16 bearing a pivot holder 17 pierced with a bore having a horizontal axis, the axes of the two holders 17 which are disposed opposite one another being in alignment.

The details shown in FIG. 10 will make more readily apparent how the rods 10 are articulated to the uprights 6 and how the running-gear elements are articulated to rod 10 of jack 9. The rod 8 rigidly secured to the lifting-jack casing 9 is in two parts and engages around the casing or outside of the uprights 6 by way of a cap 18 which screws 19 secure to rod 8. The system formed by the rod 8 and its cap 18 is held captive on upright 6 by two collars 20 welded thereto. Rings 21 interposed between the rod 8 and the collars 20 can be locked in rotation and kept clamped against rod 8 by screws 22 having locknuts 23.

The shoe 13 of the long running-gear facility is rigidly secured to a collar 24 mounted freely on jack rod 10 and having an inner conical ring 25 on which a split conical outer ring urged by a nut 27 engaged in a screwthreaded portion 27 is of collar 24 bears.

The shoe 12 of the short running-gear element is adapted to pivot freely around collar 24 and is retained thereon by a ring 24 bis. Shoe 13 is formed with an aperture 28 engaged by a locking finger 29 borne by shoe 12. When the shoes 12, 13 are aligned and opposite one another, as shown by way of example in FIG. 4, a return spring 30 keeps finger 29 engaged in aperture 28.

As FIGS. 11 to 13 show (and as FIGS. 14 and 15 show in more detailed form), the platform for container carriage has retractable supports 31 which are pivotally mounted at places 32 and which are shown at 33 in the position in which they are retracted into the platform.

The conical bore of the holder 17 can receive the conical end of a pivot pin 34 which a nut 35 and resilient washers 36 retain in position in holder 17. Pin 34 is of the same diameter as the bore in support 31 and is formed with a bore 37 adapted to receive a pin 38.

Referring now to FIGS. 16 and 4, each jack 9 is supplied by an independent hydraulic circuit which uses the tubular upright 6 as a tank or sump. The chain-dotted line framing 13 represents the running-gear shoe on which all the facilities diagrammatically shown in such framing bear. The hydraulic circuit comprises a pump 40 driven by an electric motor 41 and supplying a distributor 42 which has three lockable positions a, b, c and which is controlled either electrically by a winding 43 or by a hand lever 44. The working pressure of the circuit is supervised by a valve 45 which in the even of excess pressure delivers via a return circuit and filter 46 back to the sump 6. Valves 47, 48 piloted by respective by-passes 49, 50 control energization of the jack 9.

To pick up a container on the ground and place it on the platform, a handling portal is moved very close to each of the container end surfaces. The portals then rest on the ground by way of their running facility which is locked to the jack rods 10 so that the shoes 11 remain slightly above ground level; the portals can then move freely and the spacing between them can be adjusted by operation of the telescopic cross-member 7 so that the between-axis spacing of the uprights 6 corresponds to the between-axis spacing of the apertures in the corner members 2. Nut 27 is then slackened to release the running facility of the rod 10, the whole portal then bearing on the ground by way of the shoes 11. The electrical drive facilities for all four jacks are then connected to the battery of the draft vehicle, and with the distributor 42 remaining in the inoperative position as shown in FIG. 16, the four pumps 40 are started and deliver to the sumps 6 in closed circuit. The distributors 42 are then operated to move the jacks 9 in the direction required to bring the pins 4, 5 to the height of the apertures in the corner members 2, the pins 4, 5 then being engaged and locked in the latter apertures.

Figure 8:
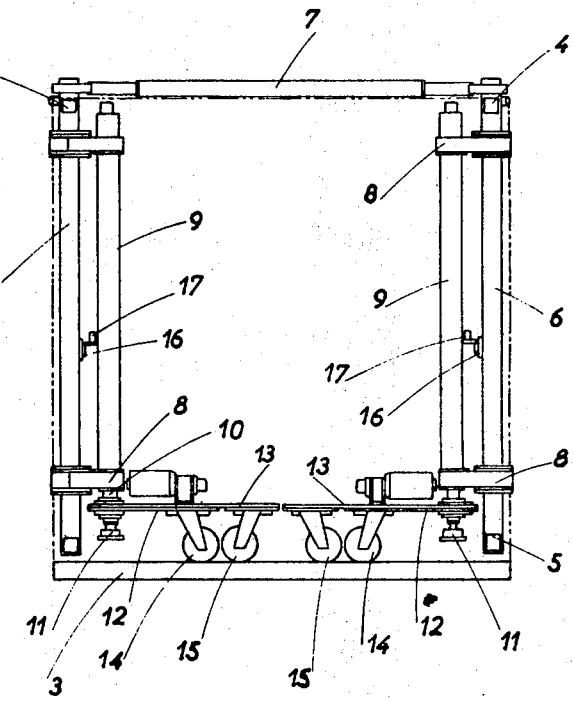
Figure 9:
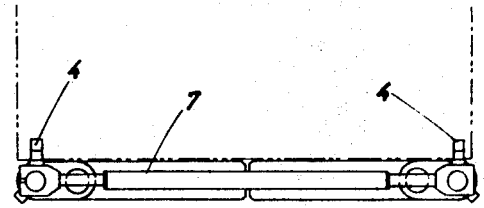

When the two portals have been rigidly secured to the container in this way, all the distributors 42 are brought to the position a simultaneously to energize the jacks 9 for their extension, with the result that the container is lifted to above platform level. The distributors 42 are then returned to the inoperative position b to immobilise the container, which now bears on the ground via the four jack rods 10, and the platform can be moved below the container, the between-axis spacing of the jacks being greater than platform width. Once the platform has been centered correctly below the container, the distributors 42 are brought to the position c and the jacks 9 are retracted so that the container descends until it rests on the platform. If the rod 10 is allowed to continue its movement right to the end of its travel, the system formed by the shoe 11 and the facilities 12, 13 are raised from the ground. The fingers 29 are disengaged from the aperture 28 to disconnect the elements 12, 13 from one another, so that the same can be folded one above another. Similarly, the screws 22 are slackened to release the articulation of the rods 8 on the uprights 6, and the jacks can be folded towards the container interior, and the system formed by the jack and the running-gear facility takes up the position which is shown in FIGS. 7 to 9 and in which the whole portal remains secured to the container without projecting from the external outline thereof. In this transportation position, the portals stay rigidly secured to the container and can be used right away to unload the container; as will be readily apparent, for unloading the operation are performed in the reverse sequence to the loading sequence hereinbefore described.

The portals can also be mounted on empty platforms in a carriage position such that they do not project beyond platform width and such that they take up a very reduced vertical space. To position the portals in this way, the platform supports 31 are first raised, whereafter the portal is moved on its running gear to opposite the supports 31 which are in the spaced-apart position so that the uprights can pass on either side of the platform 3, as shown in the left-hand part of FIG. 11, whereafter the pivot pins 34 are engaged in the supports 31 and in the holders 17, to which latter the pins 34 are rigidly secured by nuts 35 as shown in FIG. 14.

Once the supports 31 bear the portal in this way, the jacks 9 are retracted and raise the running gear facilities 12, 13, which are unlocked and folded one on another as previously described, whereafter the portal is pivoted around the pins 34 into a horizontal position, an operation facilitated by the fact that the centre of gravity of the system when raised is disposed substantially on the axis of the pins 34. The jacks 9 and facilities 12, 13 are then bent towards the inside of the platform similarly to what was described in relation to folding the portal against the container end surface, whereafter the two systems formed by the jacks and uprights are moved towards the platform axis by the pins 34 being slid in the supports 31, and when the support 16 abuts the support 31 in the manner shown in FIG. 15, the pin 34 is retained in the transverse position by the pin 38 engaged in the aperture 37. In this position no part of the portal extends beyond the transverse dimension of the platform.

For handling an empty container, all the operations can be carried out while the container bears on the ground just via the running-gear rollers and without the shoes 11 being used. The portals can then be used to move an empty container over short distances on smooth surfaces; to increase transverse rigidity of the running-gear in such cases, a releasable connecting rod 51, visible in FIGS. 4 to 6, is used to brace the two members 12 of a single portal.

Of course, constructions differing only in detail from the exemplary constructions hereinbefore described fall under the scope of this invention. Also, the hydraulic jacks described can be replaced by other lifting means, such as pneumatic or electric or screw jacks; in such cases there is no need for the tubular uprights to be used as hydraulic reservoirs.

I claim:

1. Mobile transportable container-handling apparatus characterised in that the apparatus comprises two independent portals, each portal comprising two uprights interconnected by a telescopic cross-member, each upright having means for securing it to a container, and having pivoted therein in an attitude parallel thereto a jack having at the bottom a ground engaging member and carrying a running-gear articulated thereto, means being provided to lock the running gear relative to the jack.

2. An apparatus as set forth in claim 1 characterised in that each jack is a double-acting hydraulic jack.

3. An apparatus as set forth in claim 2, characterised in that each jack is supplied via a distributor by a hydraulic unit disposed on each running-gear facility and each upright takes the form of a tube forming a reservoir for the hydraulic unit.

4. An apparatus as set forth in claim 3, characterised in that the jack supply hydraulic units are electrically controlled together or separately from a single control station.

5. An apparatus as set forth in claim 3, characterised in that a transportation vehicle battery is the electrical power supply for the hydraulic units.

6. An apparatus as set forth in claim 3, including manually operable means to control the distributor.

7. An apparatus as set forth in claim 3, characterised in that the distributors are controlled electrically from a single control station.

References Cited

UNITED STATES PATENTS

| | | | |
|---|---|---|---|
| 2,985,482 | 5/1961 | Lion | 214—515 |
| 3,010,592 | 11/1961 | Chadwick | 214—390 |
| 3,156,484 | 11/1964 | Talbert | 214—390 XR |
| 3,476,275 | 11/1969 | Cowhishaw et al. | 254—45 XR |

ALBERT J. MAKAY, Primary Examiner

U.S. Cl. X.R.

214—515; 254—45